(12) United States Patent
Sides

(10) Patent No.: US 11,099,209 B2
(45) Date of Patent: Aug. 24, 2021

(54) HIGH RANGE AND RESOLUTION SCANNING PROBE AND METHODS

(71) Applicant: ADVANCED MEASUREMENT TECHNOLOGY INC, Oak Ridge, TN (US)

(72) Inventor: Charles R. Sides, Knoxville, TN (US)

(73) Assignee: Advanced Measurement Technology Inc., Oak Ridge, TN (US)

( * ) Notice: Subject to any disclaimer, the term of this patent is extended or adjusted under 35 U.S.C. 154(b) by 0 days.

(21) Appl. No.: 16/079,817

(22) PCT Filed: Feb. 24, 2017

(86) PCT No.: PCT/US2017/019315
§ 371 (c)(1),
(2) Date: Aug. 24, 2018

(87) PCT Pub. No.: WO2017/147395
PCT Pub. Date: Aug. 31, 2017

(65) Prior Publication Data
US 2019/0094268 A1 Mar. 28, 2019

Related U.S. Application Data

(60) Provisional application No. 62/299,314, filed on Feb. 24, 2016.

(51) Int. Cl.
*G01Q 60/30* (2010.01)

(52) U.S. Cl.
CPC .................................. *G01Q 60/30* (2013.01)

(58) Field of Classification Search
CPC ...................................................... G01G 60/30
See application file for complete search history.

(56) References Cited

U.S. PATENT DOCUMENTS 7,081,624 B2   7/2006   Liu
8,443,459 B2   5/2013   Phan
8,726,410 B2   5/2014   Sathish et al.

*Primary Examiner* — Nicole M Ippolito
*Assistant Examiner* — Hanway Chang
(74) *Attorney, Agent, or Firm* — Pitts & Lake, P.C.

(57) ABSTRACT

A scanning probe used to measure and determine the features of an electrically conductive surface and which can be used to determine present corrosion state of a bare or coated metal and monitor corrosion progression under coatings that previously had to be removed to assess the present corrosion state and corrosion progression of the underlying metal surface.

8 Claims, 5 Drawing Sheets

HIGH RANGE AND RESOLUTION SCANNING PROBE AND METHODS

CROSS-REFERENCE TO RELATED APPLICATIONS

This application claims the benefit of U.S. Provisional Patent Application Ser. No. 62/299,314, filed on Feb. 24, 2016, the disclosure of which is incorporated herein in its entirety by reference.

FIELD OF INVENTION

The present inventive concept relates generally to a scanning probe used to measure and determine the features of an electrically conductive surface and which can be used to detect the presence of corrosion on the surface material.

BACKGROUND

Corrosion of metals by atmospheric moisture is electrochemical in nature. Thin layers of electrolyte form on top of metal surfaces and permit oxidation of the underlying metal surface; this includes water that permeates through organic coating, such as paints. However, the thinness of these electrolyte films makes it very difficult to use conventional electrochemical techniques to investigate the atmospheric corrosion of metal surfaces.

Conventional Kelvin probes, which do not touch the corroding metal surface during feature measurement, have been used for the determination corrosion potential profiles of both coated and bare metals exposed to moisture. The probes have been used on large-area samples, thus having a surface area greater than 100 micrometer (um) by 100 um. The Kelvin probe (KP) technique, sometimes referred to as a vibrating electrode method, works by either applying a voltage to a piezo-electric material or by applying an audio-frequency current to an electromagnet, which causes mechanical vibration to be transmitted to a small disk (probe) mounted parallel to the surface of the metal and about 10 to 2,000 um above the surface of the metal. The vibration of the small disk causes a corresponding variation in the capacitance across the air gap between the small disk and the metal surface, so that an alternating current is generated having a magnitude that is responsive to the potential difference across the air gap. Conventional KP techniques provide the resolution of surface features in the 100 um range. Additional information regarding KP techniques may be found in Oriani, J. Electrochem. Soc., Vol. 138, No. 1, January 1991.

Kelvin probes are maintained away from the electrically conductive surface having features to be measured, and are used to measure the "traditional work function" between the probe and the surface that is referred to in literature tables. Thus, KP measurements are a capacitance based measurement of a work function. The measurement is made through measurement of Contact Backing Potential. The Work Function is the amount of energy required to remove an electron from a conductor; also described as the difference in Fermi Level (average energy of electrons) and vacuum. The spatial resolution of the tip is approximately the tip diameter.

KP-based techniques using very sharp probe tips only 10's of nanometers away from the sample measure reduce response amplitude and distort work functions due to the decreased separation of the probe tip and the surface. Uncoated silicon tips have been conventionally used to form very sharp probe tips of this type.

Kelvin Probe Force Microscopy (KPFM) is a derivative technique of KP, which looks at small scan areas in the hundred micron range for the X and Y dimensions of the surface to be measured. When the KPFM tip is raised higher above the surface, for instance 0.05 um above the surface, the spatial resolution decays to around 0.2 um—which demonstrates the strict dependence of spatial resolution on probe to surface distance. KPFM methods also have the disadvantage that when the same type, but not the identical probe is used for surface measurement, the absolute values of the output voltages measured while scanning the features of the surface can vary by hundreds of mV for the identical surface. Thus, probe to probe "measurement scatter" is a problem when comparing the information obtained from one probe to the information obtained from a different probe. This measurement scatter or output signal variation between non-identical probes is a significant disadvantage for corrosion measurements, as measurement of the same surface may occur at time intervals that are too long (often greater than 1 year) to use an identical probe.

For the corrosion measurement of conductive metal surfaces, KP methods have the advantage of larger surface scan ranges, but the disadvantage of lower surface feature resolution (the resolution of more surface feature detail) in relation to KPFM methods. Conversely, KPFM methods have the advantage of higher surface feature resolution, but the disadvantage of a small surface scan range in relation to conventional KP methods.

It would be beneficial to have the ability to measure the features of a surface in the open atmosphere having a larger area than can be scanned by conventional KPFM instruments and methods and at a surface feature resolution higher than can be obtained with conventional KP instruments and methods. Such a device could determine present corrosion state of a bare or coated metal and monitor corrosion progression under coatings that previously had to be removed to assess the present corrosion state and corrosion progression of the underlying metal surface.

BRIEF SUMMARY

Embodiments of the present general inventive concept provide a probe that may be used to perform KP analysis of electrically conductive surfaces under atmospheric condition.

Additional aspects and features of the present general inventive concept will be set forth in part in the description which follows, and, in part, will be obvious from the description, or may be learned by practice of the present general inventive concept.

Example embodiments of the present general inventive concept may be achieved by providing an electrically conductive surface feature scanning device, for resolving surface features in atmospheric conditions, comprising a probe assembly including a probe tip having a diameter of less than about 20 um, one or more piezoelectric control motors operable to move the probe tip in the X and Y-axes of an X-Y plane, and a lock-in amplifier operable to separate surface feature responsive signal from background noise to provide a surface feature resolution in the micrometer range over a scan area of up to about 100 mm by 100 mm.

The probe tip may have a diameter of less than about 10 um.

The probe tip may be a metal wire.

The probe tip may be a tungsten or gold wire having an approximate diameter of 1 um.

The electrically conductive surface may be metal or a coated metal substrate.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

A probe and methods are provided that may be used to perform KP analysis of electrically conductive surfaces under atmospheric conditions. Embodiments of an example KP probe configured in accordance with the present general inventive concept have a diameter of less than approximately 20 um. In some embodiments, the KP probe has a diameter of less than approximately 10 um, and in one aspect the KP probe can be configured as a wire having a diameter of approximately 1 um, for example, from about 0.8 to 1.2 um. The wire may be a metal, and in some specific embodiments, the metal may be tungsten or gold. The probe is scanned in the X and Y-axes by piezoelectric positioning motors that provide enhanced positioning precision. A lock-in amplifier that allows extraction of small signals from background noise also is used. In combination, the probe, piezoelectric positioning motors, and lock-in amplifier provide a scan range along the X and Y-axes of the surface on the millimeter scale and having an approximately 1 um resolution of surface features. An added benefit is that probe-to-probe measurement scatter is reduced, thus allowing for corrosion progression measurements of the same surface to be made with different probes at different times and meaningfully compared. The probe and associated control motors and amplifier alternatively may be used for KPFM, in addition to KP measurements.

Figure 1:
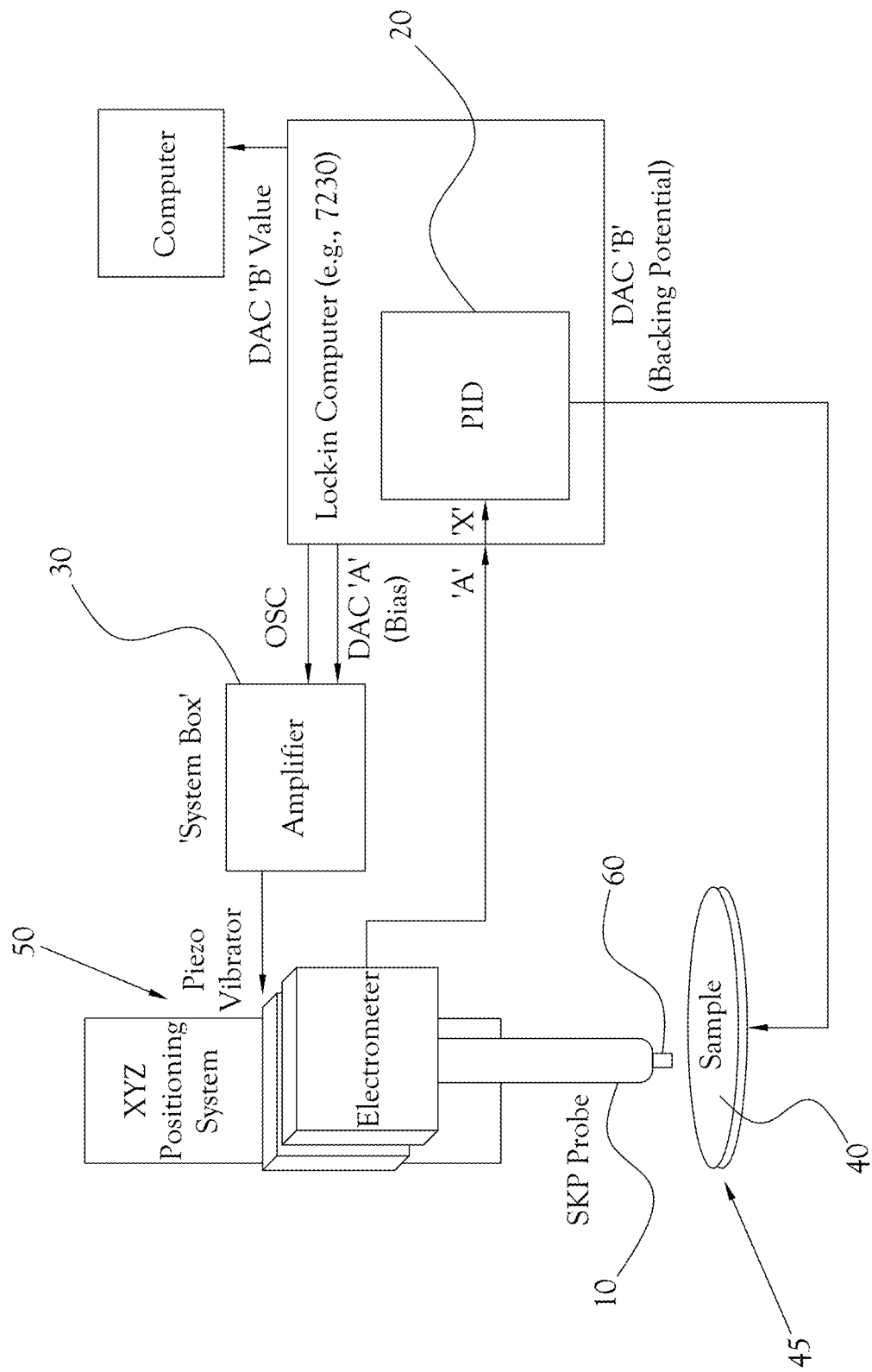
FIG. 1 shows a flow diagram representing the probe, control electronics, lock-in amplifier and sample according to an example embodiment of the present general inventive concept.

FIG. 1 is a representation of the described probe 10, control electronics 20 and lock-in amplifier 30. The probe 10 is at the end of the vibrator column 15 closest to the electrically conductive surface 40 (working electrode), which is scanned. The X and Y-axis motors 50 represent the piezoelectric motors that position the probe 10 above the sample surface 40 to be scanned. The lock-in amplifier 30 separates the desired signal from the background noise.

For KP surface measurements, the probe 10 is positioned from approximately 1 to 10 times its diameter above the surface 40 to be measured during scanning. During KP scanning, the probe 10 does not touch the surface 40 being measured, and is scanned in an X-Y plane above the surface 40 to measure the Contact Backing Potential (CBP) and provide a data map of the electrically conductive surface 40. The X-Y plane is commonly at a fixed Z, but can also use a topographic background measurement in order to increment in Z, so as to maintain a constant probe-to-sample distance. This is particularly helpful with samples 45 of complex topographies, such as welds, where the changing probe-to-sample distance would otherwise convolute the CBP measurement. Either a sweeping or step/hold scanning movement may be used for the probe 10 during scanning, which allows for data to be recorded in the form of an X-position, a Y-position, and a potential, such as in millivolts (mV), for each X-Y-position of the surface 40. In this manner, high-resolution feature measurements of surface areas greater than 100 um×100 um may be performed using a non-contact method.

Spatial resolution is an important factor in measuring surface 40 features. Improving spatial resolution by decreasing the size of detected changes in features provides the ability to image smaller features of the surface 40. Measurements made using an approximately 1 um diameter probe 10 of the present invention represent an approximately 20× improvement (reduction) in feature size that may be measured in the open atmosphere in comparison to measurements made with conventional 20 to 50 um probes 10. While feature sizes may be measured with conventional KPFM systems at resolution similar to that of the 1 um diameter probe 10 of the present invention, surfaces 40 of approximately 100 um×100 um are as large as can be measured using KPFM, as the probe 10 contacts the sample 45. This scan range limitation of KPFM severely limits the applicability of the technique to corrosion detection and progression monitoring.

Embodiments of the described probe 10, piezoelectric motor control electronics 20, and lock-in amplifier 30 can provide surface 40 feature resolution down to about 0.5 um, and in some embodiments down to about 0.05 to 0.1 um, with scan areas up to about 100 mm by 100 mm—thus providing the resolution of KPFM over an approximately 1000 times greater surface area in each direction in the open atmosphere.

Figure 2:
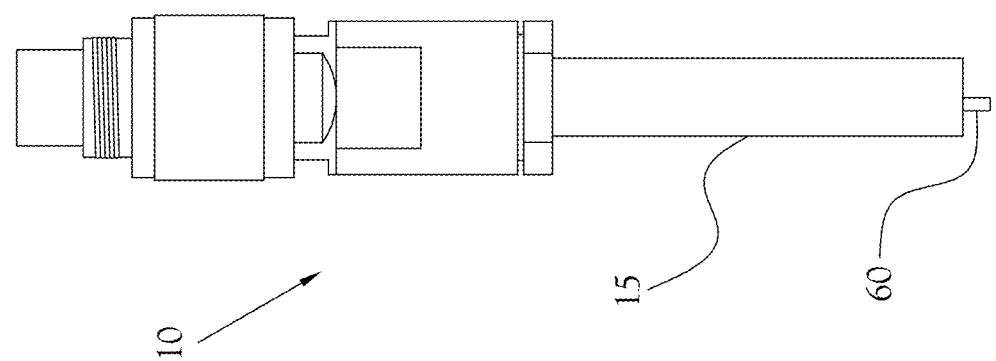
FIG. 2 illustrates a front elevation view of the probe assembly according to an example embodiment of the present general inventive concept.

FIG. 2 represents the probe 10 assembly, which includes a tungsten wire 60.

Figure 4:
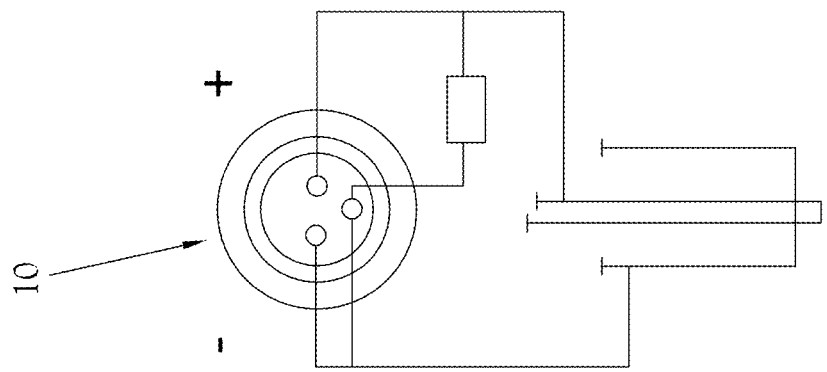
FIG. 4 illustrates a top view of the probe assembly with electrical charge representation according to an example embodiment of the present general inventive concept.
Figure 3:
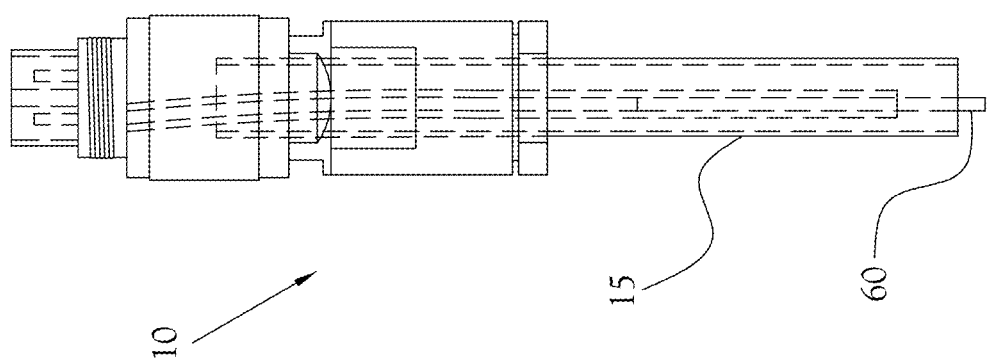
FIG. 3 illustrates a front elevation view of the probe assembly showing its internal components according to an example embodiment of the present general inventive concept.

FIG. 3 represents a probe 10 assembly, showing its internal components, in accord with the present invention. FIG. 4 shows an electrical charge representation of the probe 10 assembly.

As contact with the sample 45 is not required for the present invention and relatively large surface areas on the millimeter (mm) scale may be measured, anodic corrosion sites on metal surfaces 40, even when the corrosion is occurring under a coating, such as paint, may be reliably made at high resolution. Such non-contact, high-resolution measurements of relatively large surface areas also may be made of semiconductors and photovoltaic materials. Such non-contact, high-resolution measurements of relatively large surface areas also may be made of heat affected, boundary areas formed next to welds that are chromium deficient, or study the grain boundaries within metals and alloys. Any small feature surface 40 that can generate a Work Function may be measured at high resolution in the atmosphere over a relatively large surface area.

Figure 5:
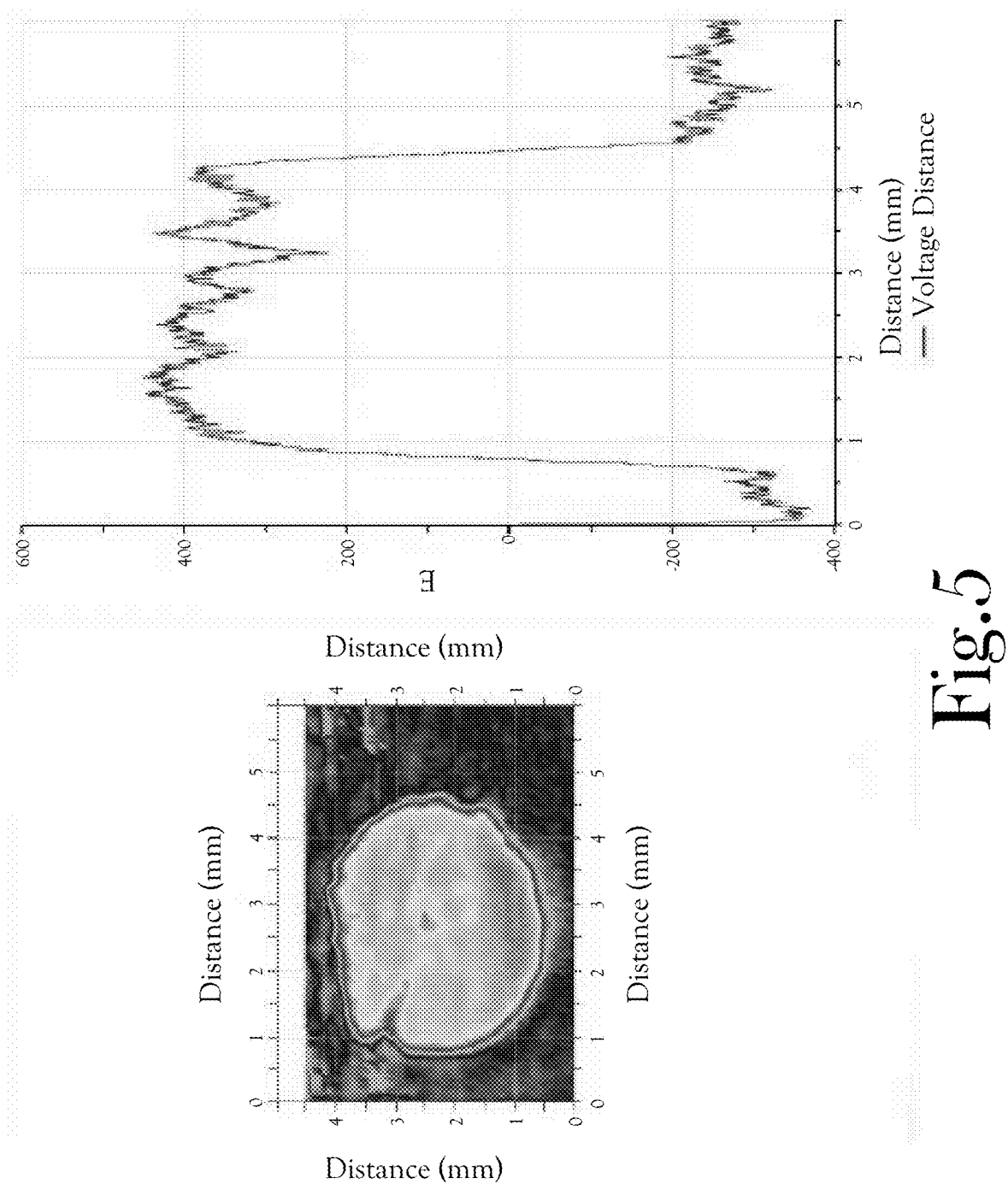
FIG. 5 illustrates a graphical relationship of data showing voltage as a function of distance using a one micrometer probe.

FIG. 5 shows the results obtained from the 1 um diameter probe 10 with 1 um movements along a distance in the X-axis provided by the piezoelectric control electronics. As can be seen at the "top" of the distance (mm) vs. voltage plot, surface 40 features of the sample 45 illustrated in the image to the left of the plot are resolved in the um range, resulting in higher resolution and higher range than can be achieved with conventional systems. The high resolution and range gives the ability to image both the big transitions between materials (e.g., @ 0.5 mm and then back to @4.5 mm). This demonstrates both the large range of measurement and the small changes within one material. For example, consider Material #1 as 0 to 0.5 mm; Material #2 as 0.5 mm to 4.5 mm; and Material #1 again from 4.5 mm to 6.0 mm. The image is for both the Material 1 to 2 and 2 to 1 transitions and the changes within a given Material section itself.

Figure 6:
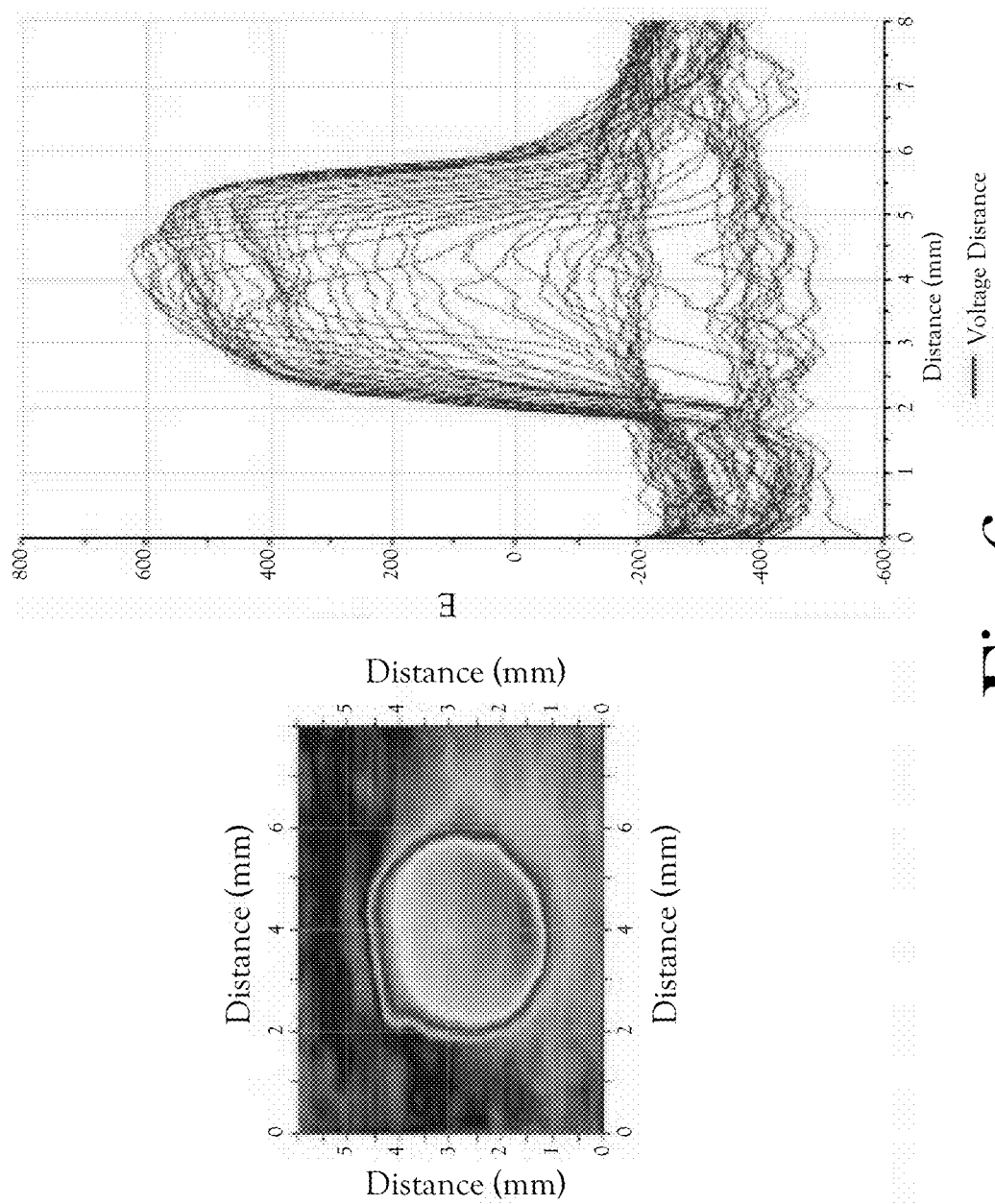
FIG. 6 illustrates a graphical relationship of data showing voltage as a function of distance using a ten micrometer probe.

By comparison, FIG. 6 is a comparative example of the same image surface 40 scanned with a conventional KP system having a 10 um diameter probe 10 and 10 um movements in the X-axis. As can be seen at the "top" of the distance vs. voltage plot, surface 40 features of the image in the um range are not being resolved as the top of the peak is a relatively smooth continuous surface, i.e. lower resolution.

Figure 7:
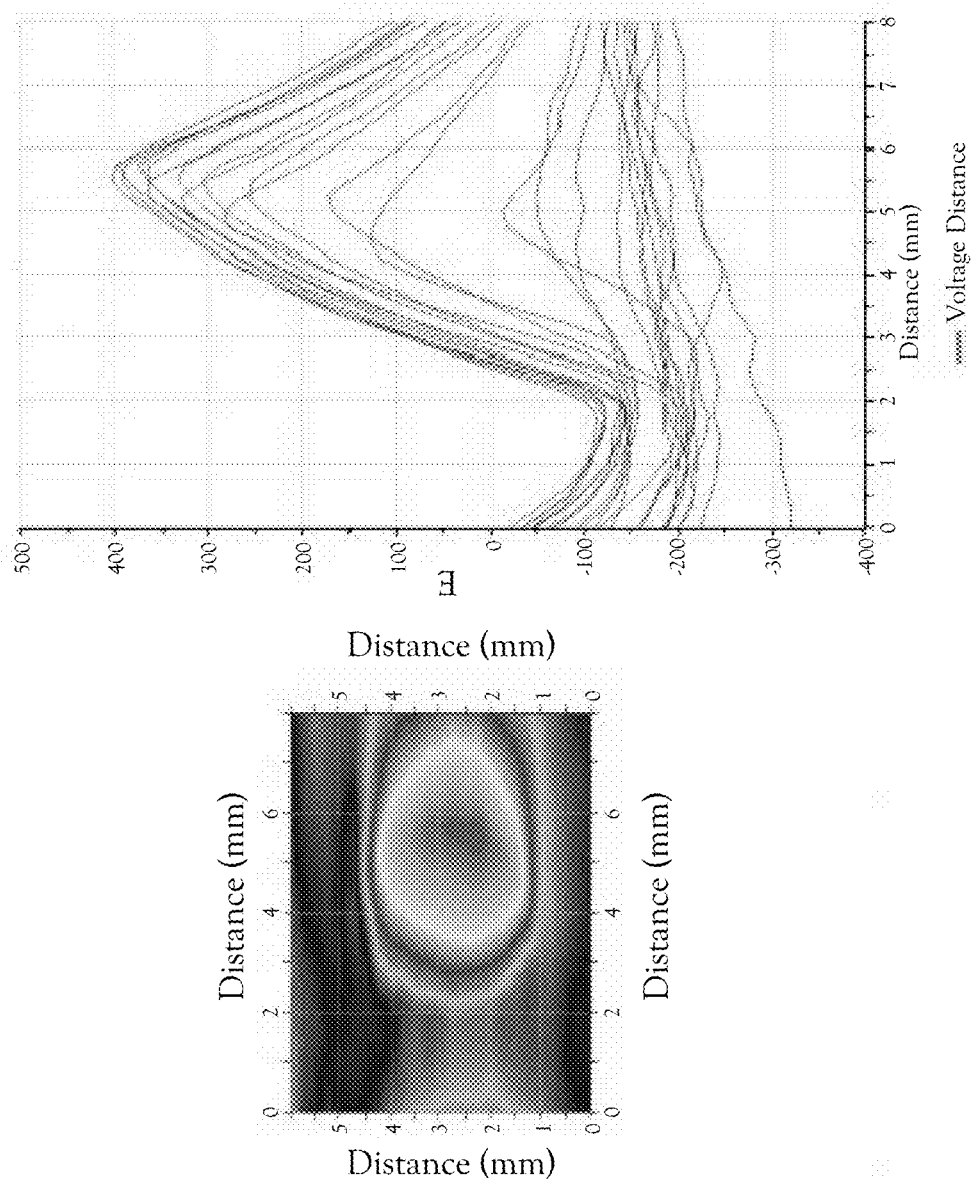
FIG. 7 illustrates a graphical relationship of data showing voltage as a function of distance using a ten micrometer probe.

FIG. 7 is another comparative example of the same surface 40 scanned with a conventional KP system having a 10 um diameter probe 10 and 500 um movements in the X-axis. As spatial resolution is a product of probe 10 diameter, these measurements serve as a baseline of that level of spatial resolution. As can be seen at the "top" of the distance vs. voltage plot, surface 40 features in the um range are not being resolved and the single feature resolved in FIG. 6 is reduced to nothing more than a "point", thus losing information regarding its actual width.

The simplified diagrams and drawings do not illustrate all the various connections and assemblies of the various components, however, those skilled in the art will understand how to implement such connections and assemblies, based on the provided illustrated components, figures, and descriptions.

The invention claimed is:

1. An electrically conductive surface feature scanning device, for resolving surface features in atmospheric conditions, comprising:
   a probe assembly including a probe tip configured to measure a Contact Backing Potential (CBT) of a surface to be inspected, the probe tip having a diameter of less than about 20 um;
   one or more piezoelectric control motors operable to move the probe tip in the X and Y-axes of an X-Y plane;
   a lock-in amplifier operable to separate surface feature responsive signal from background noise to provide a surface feature resolution in the micrometer range over a scan area of up to about 100 mm by 100 mm.

2. The device of claim 1, where the probe tip has a diameter of less than about 10 um.

3. The device of claim 2, where the probe tip is a metal wire.

4. The device of claim 3, where the probe tip is a tungsten or gold wire having an approximate diameter of 1 um.

5. The device of claim 1, where the electrically conductive surface is metal or a coated metal substrate.

6. A scanning probe device to inspect a sample surface, the scanning probe device comprising:
   a probe assembly including a probe tip configured to measure a Contact Backing Potential (CBT) of a surface to be inspected, the probe tip having a diameter of less than about 1 um;
   a piezoelectric positioning device configured to move the probe tip over the surface in increments of about 1 um along an X-Y area up to about 100 mm by 100 mm; and
   a lock-in amplifier system configured to record an X-position, a Y-position, and a CBT value of the probe at each increment along the X-Y area.

7. The device of claim 6, wherein the probe tip is a metal wire protruding from an end of a vibrator column.

8. The device of claim 6, wherein the surface comprises a changing topography in a Z-axis, and wherein the piezoelectric positioning device is configured to move the probe tip over the surface in the Z-axis so as to maintain a constant probe-to-surface distance at each increment along the X-Y area.

* * * * *